G. H. RAY.
HAND DIE STOCK.
APPLICATION FILED MAR. 25, 1912.
1,045,885.
Patented Dec. 3, 1912.
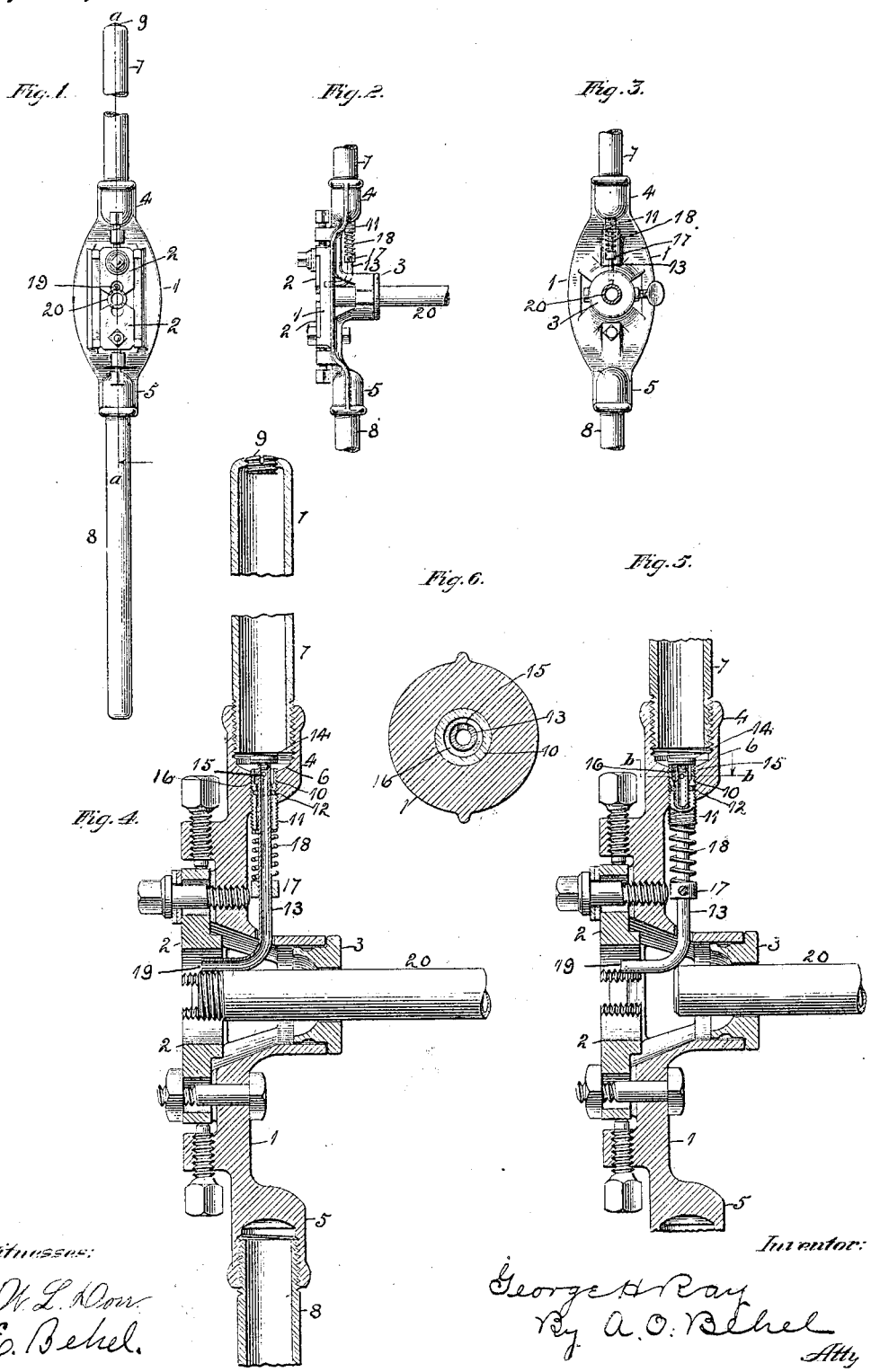
Witnesses:
W. L. Dow
E. Behel.
Inventor:
George H Ray
By A. O. Behel
Atty

UNITED STATES PATENT OFFICE.

GEORGE H. RAY, OF BELVIDERE, ILLINOIS.

HAND DIE-STOCK.

1,045,885.  Specification of Letters Patent.  Patented Dec. 3, 1912.

Application filed March 25, 1912. Serial No. 686,158.

*To all whom it may concern:*

Be it known that I, GEORGE H. RAY, a citizen of the United States, residing at Belvidere, in the county of Boone and State of Illinois, have invented certain new and useful Improvements in Hand Die-Stocks, of which the following is a specification.

The object of this invention is to provide an automatic oiling device for hand operated die stocks.

In the accompanying drawings. Figure 1 is a front elevation. Fig. 2 is a side elevation. Fig. 3 is a rear elevation. Fig. 4 is a section on line $a\ a$ Fig. 1, in which the valve is open. Fig. 5 is a section on line $a\ a$ Fig. 1, in which the valve is closed. Fig. 6 is a section on line $b\ b$ Fig. 5.

The hand die stock shown in the drawings, in the main, is of an old construction to which I have applied my improvements.

The head 1 is provided with sectional dies 2 and with a support for a collar 3. The ends 4 and 5 are internally screw-threaded, and the end 4 is formed with a bottom 6. A tubular lever 7 has a screw-thread connection with the end 4, and a lever 8 has a screw thread connection with the end 5. The end of the tubular lever 7 is closed by a screw-plug 9.

A screw 10 has a connection with the bottom 6 of the end 4 and is tubular, a tubular screw 11 is turned in connection with the bottom 6 of the end 4 and forms a continuation of the screw 10. Between the screws 10 and 11 is located a flexible washer 12.

A tube 13 is located in the tubular screws 10 and 11 and has a removable cap 14 connected to one end and is adapted to be seated on the end of the tubular screw 10 thereby acting as a valve. This tube near the cap 14 is formed with an opening 15 communicating with the space 16 in the upper end of the screw 10. A collar 17 is secured to the tube 13. A coiled spring 18 surrounds the tube 13 having one end resting against the collar 17 and its other end resting against the tubular screw 11. The action of this spring is to hold the cap 14 sealed against the end of the tubular screw 10. The tube 13 has its end 19 bent at right angles to its length and pointing toward the dies 2.

In use, the screw plug 9 is removed and the tubular lever 7 filled with oil, the cap 14 resting against the end of the screw 10 will prevent the escape of oil from the lever.

In placing the die stock on a section of pipe 20 on which threads are to be cut, the end 19 of the tube 13 will contact with the pipe section thereby moving the tube lengthwise which will move the cap 14 free of its seat on the screw 10, thereby permitting the oil in the lever 7 to pass through the opening 15 into the tube 13 and escape through its bent end 19 onto the pipe section, each turn of the lever 7 is brought into a vertical position over the pipe section, being threaded, oil will escape on the pipe section, and the oil will flow back to the lever 7 when the lever is moved from this position.

When the stock is not in use, it may be turned in any position as the cap will be seated, and the flow of oil cut off.

I claim as my invention.

1. The combination of a hand die-stock, dies supported therein, a reservoir supported thereby, a valve at the base of the reservoir, and a tube connected to the valve, leading to the dies and so disposed, that upon entering a pipe section into the die-stock to be threaded, said pipe will automatically operate said tube, unseating the valve and allowing a flow of oil from the reservoir to the dies.

2. The combination of a hand die-stock, dies supported therein, a reservoir supported thereby, a valve seat at the base of the reservoir, a valve seated thereon, and a movable tube rigidly secured to said valve, leading to a point adjacent to the dies and forming an oil passage from the reservoir to the dies.

3. The combination of a hand die-stock, dies supported therein, a reservoir supported thereby, a valve at the base of the reservoir, a tube rigidly secured to the valve and leading to a point adjacent to the dies, a spring adapted to hold the valve seated, and an opening in the tube adapted to communicate with the reservoir.

4. The combination of a hand die-stock, dies supported therein, a reservoir supported thereby, a valve at the base of the reservoir, a tube secured to the valve, an opening in the tube adapted to communicate with the reservoir, and a spring adapted to hold the valve seated, the free end of the tube formed with an elbow and leading to a point adjacent to the dies, the elbow so disposed that upon threading a pipe section, said pipe will contact with the elbow, thereby raising the valve and allowing a flow of oil from the reservoir to the dies.

In testimony whereof I have hereunto set my hand in presence of two subscribing witnesses.

GEORGE H. RAY.

Witnesses:
ALICE A. WELD,
M. C. MAREAN